United States Patent [19]

Cousin et al.

[11] Patent Number: 4,707,977

[45] Date of Patent: Nov. 24, 1987

[54] COMPOSITE CORD MANUFACTURING METHOD

[75] Inventors: Jean-Claude Cousin, Wervicoq Sud; Jacques A. Robin, Paris, both of France

[73] Assignee: Cousin Freres, Wervicoq Sud, France

[21] Appl. No.: 862,030

[22] Filed: May 12, 1986

Related U.S. Application Data

[63] Continuation-in-part of Ser. No. 600,309, Apr. 13, 1984, abandoned.

[30] Foreign Application Priority Data

Apr. 14, 1983 [FR] France .................................. 83 06084

[51] Int. Cl.4 ............................................. D02G 3/40
[52] U.S. Cl. ........................................ 57/297; 57/7; 57/295; 156/148; 156/166
[58] Field of Search .................................. 57/295–297, 57/6, 7; 156/148, 166, 167

[56] References Cited

U.S. PATENT DOCUMENTS

| 1,797,249 | 3/1931 | Truesdale et al. | 57/7 |
| 1,993,110 | 3/1935 | Myers, Jr. | 57/7 X |
| 2,028,158 | 1/1936 | Hodson | 57/7 X |
| 2,062,060 | 11/1936 | Hodson | 57/7 |
| 2,427,507 | 9/1947 | Powell 3rd et al. | 57/7 X |
| 3,085,388 | 4/1963 | Ansell et al. | 57/7 |
| 4,197,695 | 4/1980 | Hughes et al. | 57/7 |

Primary Examiner—John Petrakes
Attorney, Agent, or Firm—Thomas A. O'Rourke

[57] ABSTRACT

In a method of manufacturing a composite cord, in particular for use in stringing tennis rackets, continuous fibers are twisted together while a liquid binder is applied between them. This occurs just before the fibers are twisted through a die which wipes the binder and forms a protective sheath. Cords are manufactured at reduced cost through the elimination of heating of the entire cord.

4 Claims, 5 Drawing Figures

COMPOSITE CORD MANUFACTURING METHOD

This is a continuation-in-part of application Ser. No. 600,309, filed Apr. 13, 1984 and now abandoned.

BACKGROUND OF THE INVENTION

1. Field of the Invention

The object of the present invention is a method of manufacturing a composite cord intented particularly, but not exclusively, for stringing tennis rackets. The invention is also directed to the cords obtained using this method.

2. Description of the Prior Art

It has long been known to manufacture cords from two or more components. This structure results from the fact that there are not available on the market fibers which combine the required tensile strength with the necessary hardness. When tension is applied, the fibers constituting the cord are brought into contact with one another and abrasion occurs leading to rapid wear. Also, the cords have to resist different forms of physical/chemical attack by virtue of their use in various environments. For this reason it has already been proposed to enclose the fibers constituting the cord in a protective sheath made of a material which is harder than the fibers themselves and which isolates them from attack by atmospheric agents. This action may be strengthened by internal lubrication.

The American patent U.S. Pat. No. 4,197,695 describes solution to the problem of protecting wires against corrosion, which consists in sealing individual strands with a plastic foam surrounded with a dense unfoamed plastic material The plastic foam coatings are sprayed on the strands and after dryed and cured by heating. Each strand embedded in the uncured foam plastic is then covered by a cover of unfoamed plastic material. However, this patent is not directed to the formation of a composite cord as in the present invention and it is necessary to provide a further heating to foam the first plastic material and to cure the unfoamed plastic material.

In the more particular case of tennis racket strings, the conditions of utilization are also very demanding. These strings must have elastic properties which are a priori incompatible with the tensions which players insist on. Moreover, their criss-cross application involves bends through at least 90°, the various strings bearing on one another and so accentuating the compression-abrasion problem.

The French Pat. No. FR-B-80 20663 describes solution to the problem of obtaining a composite tennis racket string, which consists in coating polyamide multifilament yarns with a solution of polyurethane which can be melted by the application of heat, the multifilament yarns being impregnated right through, dried, twisted and then heated so that the polyamide fibers form an armature between the strands of which there is disposed a flexible binder which contributes to a rapid return to the rest position after impact with the ball. Strings manufactured using this method have been found to offer playing qualities comparable with or better than those of the best natural yarns, with very much enhanced durability.

The methods which have just been described are nevertheless relatively slow by virtue of the need for prolonged heat treatment, whether this is to evaporate solvents followed by heating or a single melting operation. This results in a high manufacturing cost, in particular because of the thermal energy employed. In all these methods, it is necessary to heat the entire cord. The objective of the present invention is to remedy this disadvantage and to provide for faster manufacture and consequently a reduced manufacturing cost as compared with known methods.

SUMMARY OF THE INVENTION

The present invention consists in a method of manufacturing a composite cord by twisting fibers whilst applying a binder in liquid state between said fibers and then to allow the cord to cool to put the binder in a solid state. The ratio in total weight of the binder is comprised between 45 and 55%. In this way it is the twisting which distributes the liquid binder between the multifilament yarns constituting the cord and over the outside of the latter. Thus twisting brings about wiping. The binder on the outside can be immediately smoothed to a finished dimension in an appropriate die.

In accordance with the present invention the structure of the cord is completed in a single operation, whereas in the known methods it is necessary to provide for heating to homogenize the cord. This results in a saving in time and energy, the manufacturing rate being increased by a factor of the order of 60.

According to a further feature of the invention, the binder is introduced in the die before the yarns are twisted. That provide a good impregnation of the multifilaments before the binder is introduced between and around the yarns by twisting.

Other objects and advantages will appear from the following description of an example of the invention when considered in connection with the accompanying drawings, and the novel features will be particularly pointed out in the appended claims.

DESCRIPTION OF THE PREFERRED EMBODIMENTS

Figure 1:
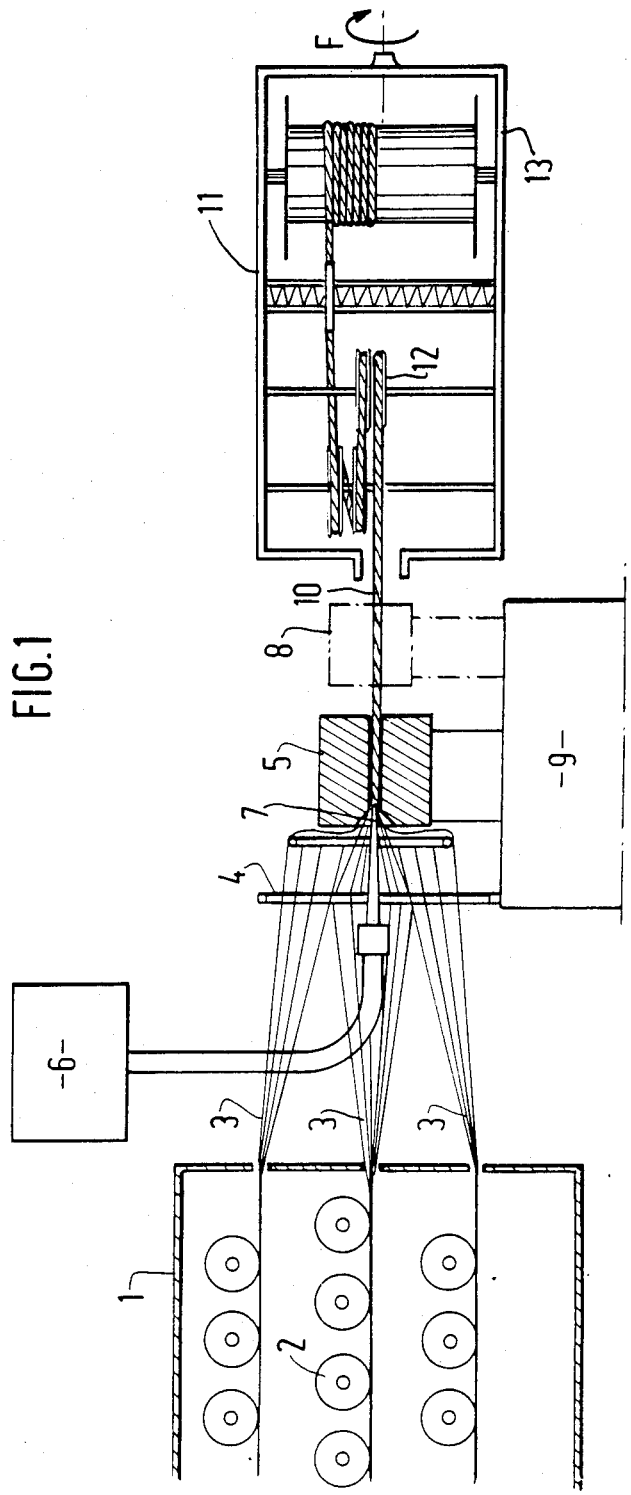
FIG. 1 is a schematic representation of plant for manufacturing cords in accordance with the invention.

Referring to FIG. 1, the plant comprises (from the left towards the right) a creel 1 carrying a number of bobbins or rolls 2 loaded with multifilament yarns 3. These yarns 3, the number of which may vary between 6 and 12, for example, are passed through a register plate 4 which guides them towards a die 5. An extruder system 6 ending with an injector 7 feeds liquid binder into the interior of the die 5, at the center. The register plate 4 and the die 5 are rigidly attached to a frame 9 which optionally carries a sizing die 8 shown in chain-dotted line in FIG. 1. The composite cord 10 obtained by assembling the fibers and the binder is directed from the outlet of the die 8 to a rotating hollow spindle 11 carrying a set of capstans 12 designed to provide a regular tension and a take-up spool 13. The hollow spindle 11 turns in the direction indicated by the arrow F, for example, and is responsible for twisting the yarns which constitute the cord. The cord 10 is wound onto the take-up spool 13 as it is manufactured.

Figure 2:
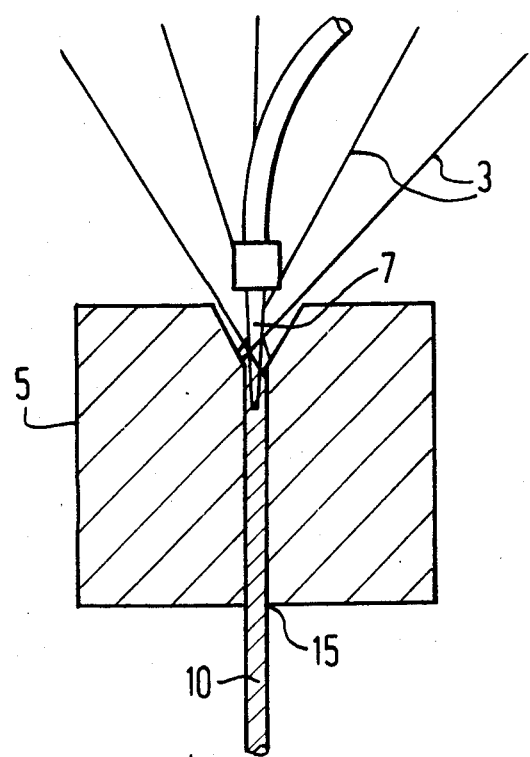
FIG. 2 shows diagrammatically a first method of injecting liquid binder through an injection nozzle.

FIG. 2 is a view to a larger scale of the die 5 of which the front part (in the direction of advance of the yarns) features a conical orifice which guides the yarns 3. As seen in the figure, the extruder head penetrates into the interior of the orifice 15 of the die. Thus the molten binder is conducted in a highly accurate manner to the center of the strand which is progressively built up, by virtue of the rotation of the hollow spindle 11, from the yarns 3 before the latter are pressed against one another. As these yarns advance into the die, they are progressively compressed and this compression provides on the one hand for coating the yarns on the inside and on the other hand for wiping off excess binder on the outside of the cord where it is regularized by the die 5 and optionally by the die 8. The binder is injected under pressure. The cord is thus to some extent formed naturally, the binder filling the spaces left empty by the fibers and by the yarns.

Figure 3:
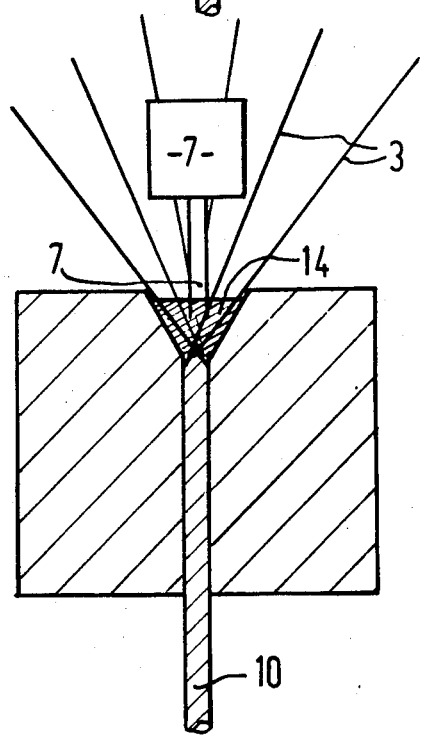
FIG. 3 shows diagrammatically an alternative method.

Another solution is represented schematically in FIG. 3, in which the cone 14 is used as a reservoir of liquid binder, the binder level being maintained constant by continuously adding binder. Thus the yarns 3 pass through the cone 14 and become impregnated with the liquid binder before they are twisted. The speed at which the yarns move, which is of the order of several meters per minute, results in a suction effect which entrains the binder towards the bottom of the die. At previously, twisting results in wiping of the binder. It will be understood that the thickness of the cord obtained depends on the diameter of the yarns 3 and the diameter of the die 5. The surface finish of the cord obtained may be improved, if necessary, by passing the cord 10 through a second die 8.

The binder is introduced in the form of powder of granules into a device 6 comprising thermostatically controled heating means and means for applying a pressure, such as a gear pump, the device being connected to the injector 7 by a pipe the temperature of which is also thermostatically controled. It will be understood that the device is set up so that the quantity of liquid binder introduced per unit time is equal to the quantity of binder penetrating to the interior of the strands of the cord and round them. The melting point of the binder is preferably lower than the melting or softening temperature of the material constituting the yarns 3, by 50°, for example, so as not to damage the multifilament yarns which, in the case of nylon, begin to melt at around 190° C. Nevertheless, it has been observed that the binder cools very fast, and so the temperature of the liquid binder may be, in some cases, higher than the melting point of the fibers without any substantiel deterioration of the latter being detectable.

The yarns 3 are preferably multifilament yarns of "nylon" type polyamide, whereas the binder is a product of the "hot melt" type consisting of copolymers of polyamide, polyurethane, ethylene-acrylic acid or vinylidene chloride or fluoride, the copolymers being selected on the one hand according to their extension at yield point in order to respect the constraints specific to tennis racket strings and on the other hand according to their viscosity at high temperature, which must be sufficient to permit correct impregnation of the multifilaments yarns 3. A viscosity of the order of 20 poises is considered satisfactory in permitting coating of the fibers and homogeneous distribution of the binder between the latter. The dies 5 and 8 ensure that the periphery of the string is of circular shape.

Figure 4:
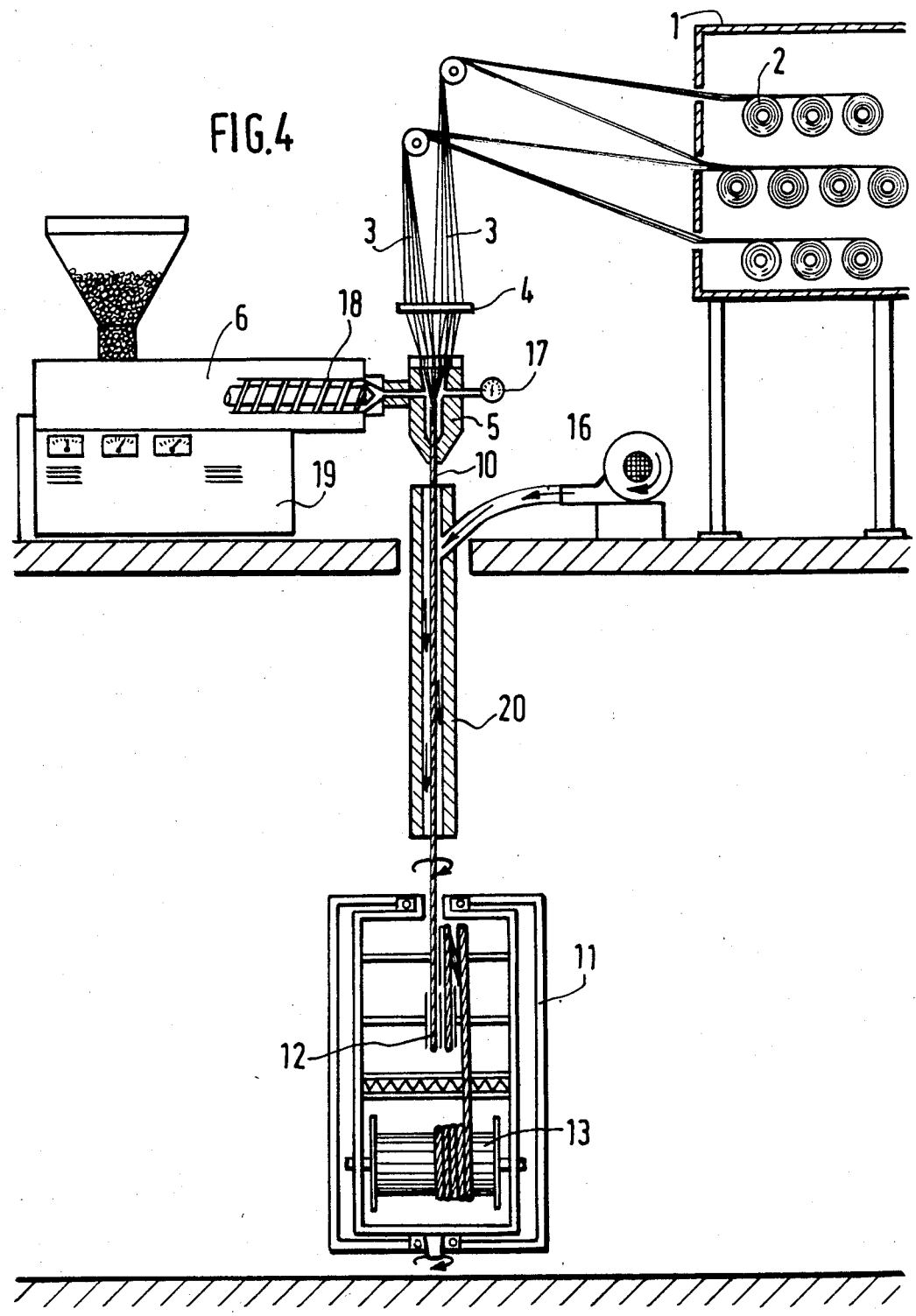
FIG. 4 an effective plant to obtain cords according to the invention.
Figure 5:
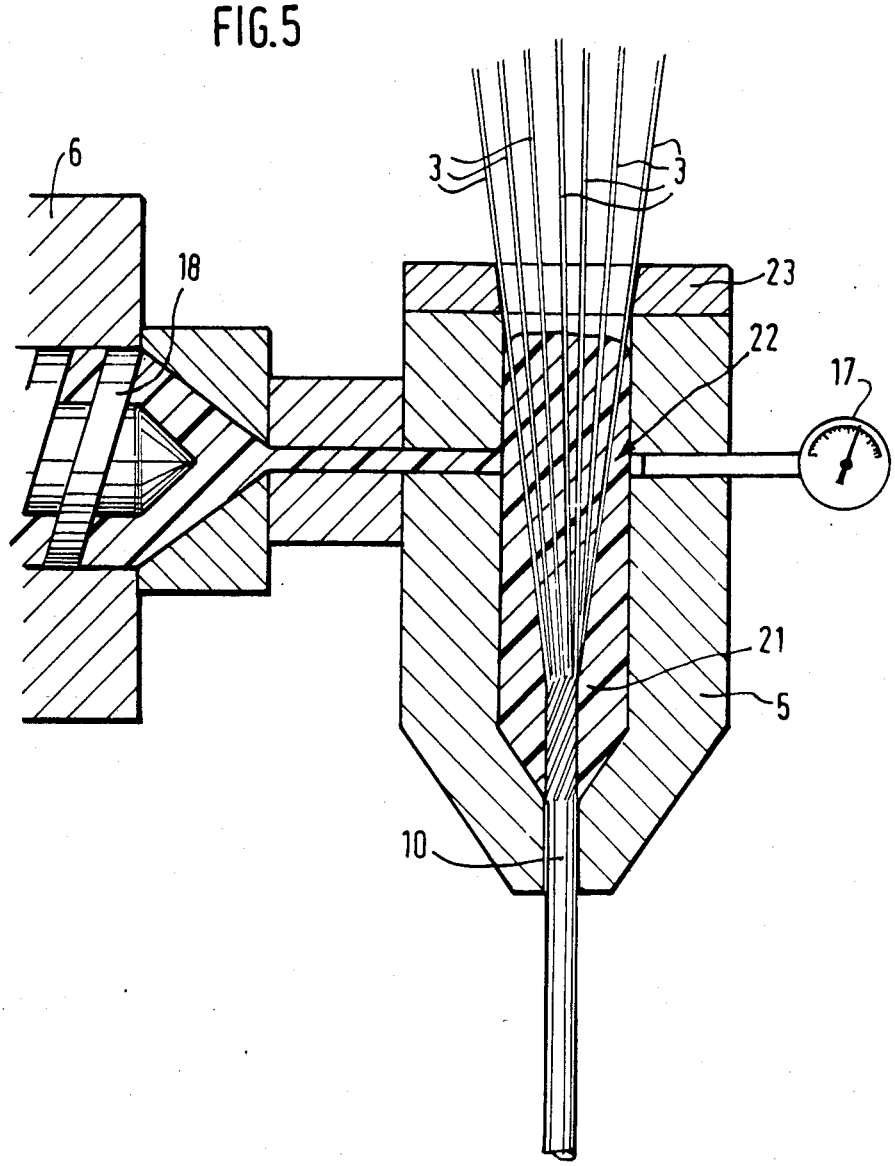
FIG. 5 is a vertical cross section of the die at enlarged scale.

FIGS. 4 and 5 show a preferred embodiment. One can see on FIG. 4, the creel 1 bearing a multiplicity of rolls 2 of multifilaments yarns 3. The binder is heated in an extrusion device 6 from granules and introduced in the die 5 by a screw 18. Pressure and temperature of the binder are electronically controled by an appropriate device 19. A manometer 17 allows to survey the pressure inside the die. This pressure can vary from 5 to 20 bars depending upon the viscosity of the binder. More the viscosity is low, more the pressure can be high to provide a good impregnation of the multifilaments. In this embodiment, the binder flows in a direction perpendicular to the displacement direction of the cord. At the end of the die 5 is provided a cooler 20 inside of which circulates a air flow delivered by a fan 16.

According to one feature of the invention, the cord in its final state is pulled on a take-up spool 13 contained in a rotating hollow spindle 11 under tension. To obtain a cord with homogeneous characteristics, it is crucial to maintain the tension constant during all the cord formation. That means that this tension must be maintained uniform when the spool is empty as well as when the spool is full. The rate of twisting given by the rotation of the hollow spindle 11 is of about 150 turns by meter.

FIG. 5 shows the inside of the die 5. The yarns 3 enter the die through a hole formed in a plate 23. All the yarns 3 constituted for example of 140 filaments of polyamide are impregnated at the level 22 of the binder injection inlet under pressure and are twisted in the twisting point 21.

The level difference between the points 21 and 22 is critical to obtain a cord with desired characteristics. The level of the twisting point 21 depends on the speed of cord formation which can be of about 500 meters by hour and of the rate of twisting.

To obtain a convenient tennis string, it is recognized that this string must present an hardness comprised between 55 and 65 Shore D. With a polyurethan binder the fusion temperature is comprised between 170° and 240° C.

The process of manufacturing of a cord according to the invention allows to obtain excellent cords at a great speed with only few energy.

We claim:

1. A method of manufacturing a composite cord, particularly for tennis rackets, from two different components constituted solely of thermoplastic material, each of the components having a ratio in weight comprised between 45 and 55% of the total weight, the first component being constituted of textile multifilament synthetic yarns and the second component being a thermoplastic binder the softening point of which is lower than the softening point of the first component comprising:

passing the first component through a die
  heating the second component to a semiliquid state and then introducing it under pressure into the yarns in the die to impregnate the yarns before they are twisted together,
  twisting the yarns under tension by a rotational movement of a take-up spool to flow the second component into surrounding relationship with said yarns,
  compressing the assembly of the first and second components in the die, and then cooling the composite cord to return it to ambient temperature and roll it on a 2. A method of manufacturing a composite cord according to claim 1, in which the first component is constituted of multifilaments of polyamide, the second component being a thermoplastic binder selected from the group consisting of copolymers of polyamide, polyurethanes, ethylene-acrylic acid and vinylidene halogenides.

3. A method of manufacturing a composite cord according to claim 1, in which the point where the yarns are twisted together is at a level lower than the level of injection of the second component under pressure, in a semi-liquid state.

4. A method of manufacturing a composite cord according to claim 1 wherein said yarn is twisted by the rotation of a hollow spindle.

* * * * *